Sept. 15, 1931.   F. NAGLER   1,823,624

HYDRAULIC APPARATUS

Filed March 23, 1923

Inventor
F. Nagler
by
Attorney

Patented Sept. 15, 1931

1,823,624

UNITED STATES PATENT OFFICE

FORREST NAGLER, OF WAUWATOSA, WISCONSIN, ASSIGNOR TO ALLIS-CHALMERS MANUFACTURING COMPANY, OF MILWAUKEE, WISCONSIN, A CORPORATION OF DELAWARE

HYDRAULIC APPARATUS

Application filed March 23, 1923. Serial No. 627,042.

This invention relates in general to improvements in the construction and operation of hydraulic apparatus, and relates more specifically to improved means for enhancing the capacity and the efficiency of certain types of hydraulic turbines and other hydraulic machines.

Generally stated, the object of the present invention is to provide simple and efficient means for improving the operation of hydraulic apparatus.

In operating submerged hydraulic turbines wherein the spaces between the successive buckets of the runner are normally completely filled with water and communicate with a flow decelerating device such as a draft tube, the relatively high vacuum in the draft tube and the rapidly rotating runner adjacent thereto, create a local circulatory pumping action when the turbine inlet gate is only partially open. This internal pumping action produces a local circulation of water adjacent to the central axis of the draft tube and of the runner and materially reduces the power output and the efficiency of such machines when operating at part gate opening. It has been found that the horse power output and the efficiency may be materially enhanced at gate openings below about six or seven tenths, if air is admitted to the runner and to the draft tube. Such admission of air not only eliminates the objectionable pumping action by reducing the vacuum in the draft tube and in the spaces between the runner vanes, but it also causes the runner vanes to be enveloped by a film of air thereby reducing the friction upon the wetted blade surfaces. The admission of air is preferably accomplished automatically and the quantity of air admitted may be increased as the gate opening diminishes, no air admission being desirable after the inlet gate has been opened beyond six or seven tenths full opening.

More specifically stated, the present invention contemplates provision of simple, compact, efficient and automatically operable means for improving the operation of submerged turbines and other hydraulic machines having similar characteristics of operation. The invention may find advantageous application in submerged turbines having high or low speed characteristics, as well as in other types of turbines and hydraulic pumping apparatus.

While the structure for admitting air from an external source to the central portion of a vortex of water which operates a hydraulic turbine, is disclosed herein, similarly functioning structure is disclosed and claimed in Patent No. 1,529,634 granted March 10, 1925.

A clear conception of an embodiment of the present invention and of the operation of devices constructed in accordance therewith may be had by referring to the drawings accompanying and forming a part of this specification in which like reference characters designate the same or similar parts in the several views.

Figure 1:
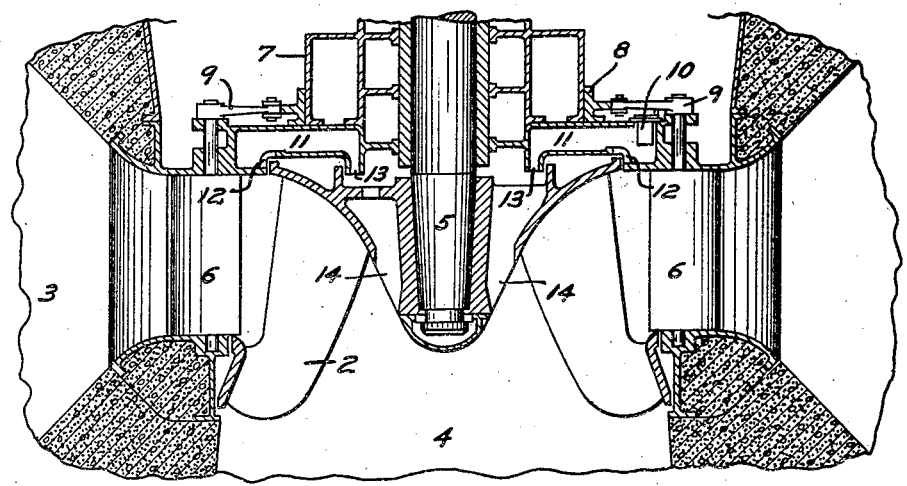
Fig. 1 is a central vertical section through a Francis hydraulic turbine having the improvement applied therein.

The hydraulic turbine installation specifically illustrated in Fig. 1 comprises in general a Francis turbine rotor 2 firmly attached to the lower extremity of a rotary vertical main shaft 5, a spiral inlet conduit 3 communicating with the rotor 2 through a speed ring and adjustable guide vanes 6 forming the inlet gate mechanism, a flow decelerator or draft tube 4 communicating with the discharge side of the rotor 2, and a stationary casing 7 forming an enclosure for the rotor 2 and providing a support for the guide bearing of the vertical main shaft 5. The guide vanes 6 are arranged in an annular series and are pivotally supported upon vertically arranged pivot pins each having an inwardly projecting actuating arm 9 secured to the upper extremity thereof. All of the actuating arms 9 are connected with a common shifting ring 8 by means of actuating links, the annular series of guide vanes 6 being simultaneously adjustable to control the quantity and the degree of whirl of water admitted to the rotor 2 by shifting the ring 8 about the central axis of the shaft 5.

Figure 3:
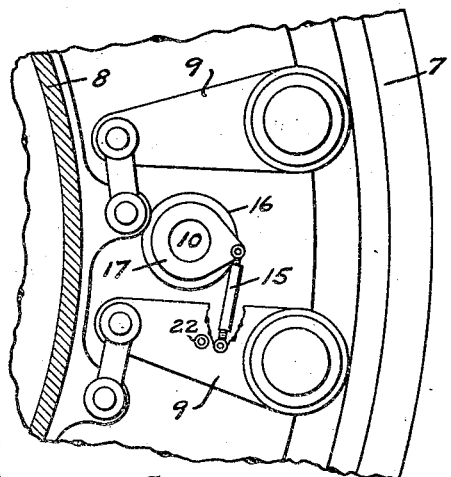
Fig. 3 is an enlarged fragmentary part sectional top view of the unit disclosed in Fig. 1, showing details of construction of the improved air admission means.
Figure 4:
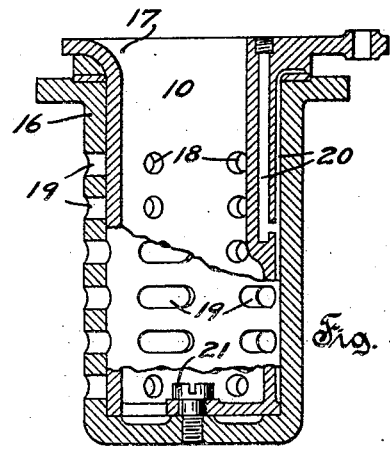
Fig. 4 is an enlarged fragmentary central vertical sectional view through the improved air admission apparatus.
Figure 2:
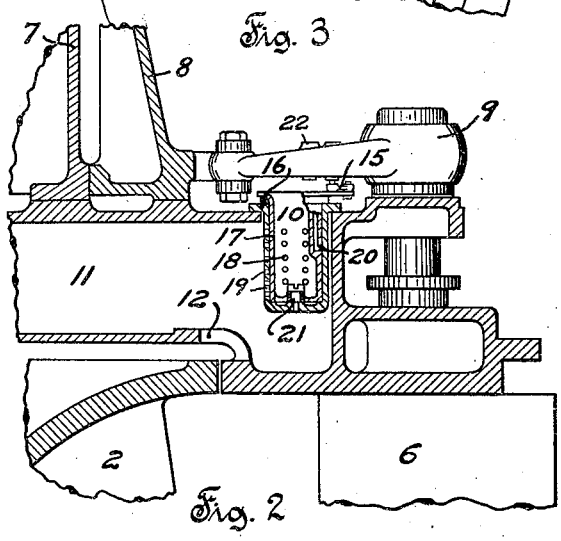
Fig. 2 is an enlarged fragmentary sectional view of the installation shown in Fig. 1, showing details of construction of the improved air admission means.
Figure 5:
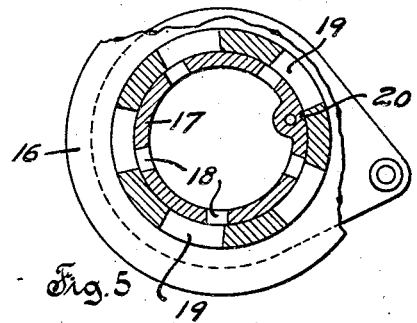
Fig. 5 is an enlarged fragmentary transverse horizontal sectional view through the improved air admission apparatus, looking in an upward direction.

The air admission mechanisms or devices 10 may be one or more in number, and are suitably supported by the stationary casing 7 as illustrated in Figs. 1, 2 and 3. Each of the devices 10 comprises a stationary cup shaped outer casing 16 having a plurality of elongated openings 19 therein, and an oscillatory inner casing 17 of cylindrical form closely fitting the vertical bore of the outer casing 16. The inner casing 17 is provided with a plurality of radial circular through openings 18 which are adapted to register to variable extents with the openings 19 of the outer stationary casing 16. The inner movable casing 17 is retained in position within the outer stationary casing 16 by means of a removable cap screw 21, and is provided with suitable ducts 20 for effecting lubrication of the bearing surfaces between the casings 16, 17. The upper extremity of the inner casing 17 is provided with a lateral projection forming an actuating crank which is connected to a medial portion of an adjacent guide vane actuating arm 9 by means of an adjustable connection 15. The connection 15 is variable in length and may be attached at various places 22 along the adjacent arm 9, in order to vary the time and the degree of opening of the air admission ports or openings 18.

The main turbine casing 7 is provided with an annular chamber 11 communicating directly with the openings 19 of the outer casing or casings 16, and indirectly communicable with the interior of the draft tube 4 and with the rotor 2 through a plurality of ports 12, 13, 14. The ports 12, 13 are formed in the stationary casing 7 while the ports 14 are formed in the rotor hub. The rotor ports 14 are preferably located as near to the central vertical axis of the rotor 2 and of the draft tube 4, as possible in order to inject the air into the portion of the turbine where undesirable circulatory pumping action is apt to occur.

During normal operation of the unit, the connections 15 are properly connected and adjusted to produce maximum opening of the air admission openings 18 in the movable casing 17, when the main turbine gate or guide vanes 6 are in closed position. As the guide vanes 6 are adjusted toward open position, the openings 18 are automatically and gradually closed, complete closing of the air inlet ports being effected when the turbine inlet gate has reached about six or seven tenths full opening. Opening of the turbine gates beyond this point results in admission of water alone.

As the turbine gates open, water is permitted to pass from the inlet conduit 3, past the guide vanes 6, and through the rotor 2 to the draft tube 4. The water thus admitted attains a high velocity and imparts a rotary movement to the rotor 2 and to the main shaft 5. The water leaving the rotor creates a vacuum in the draft tube 4, and when the turbine gate is only partially open, this vacuum in the draft tube 4 and the rotor 2 rotating above the same tend to produce a local circulation of water along the central axis of the draft tube 4 and through the inner portions of the spaces between the rotor vanes. This tendency toward pumping is however counteracted by the air admitted through the openings 18, 19, this air causing a reduction of the vacuum in the draft tube 4 and rotor 2 and producing an air film on the rotor vanes. As the turbine gates are opened wider, the spaces in the rotor and in the draft tube become filled with water and the tendency toward local pumping disappears, whereupon it is no longer desirable to admit air. The complete filling of the passages with water is ordinarily accomplished at about six or seven tenths full gate opening at which time the air admission automatically ceases.

It will thus be noted that the air control mechanisms 10 automatically function to eliminate the undesirable local internal circulatory pumping action at all gate openings. When such pumping action is permitted to occur, considerable power is absorbed in order to maintain the same, this power being conserved by the admission of air and elimination of the undesirable condition. The air admission apparatus functions automatically and is capable of flexible adjustment to produce desirable operation. The invention is capable of convenient application to old installations as well as to new units and may be applied to various types and forms of hydraulic turbines, pumps and other apparatus.

It should be understood that it is not desired to limit the invention to the exact details of construction and to the precise manner of operation herein shown and described, for various modifications within the scope of the claims may occur to persons skilled in the art.

It is claimed and desired to secure by Letters Patent:

1. In combination, a rotor, movable gate mechanism for varying the quantity of liquid admitted to said rotor, and means operable directly by said gate mechanism for admitting air to said rotor.

2. In combination, a rotor, adjustable guide vanes for varying the quantity of liquid admitted to said rotor, a flow decelerator associated with said rotor, and means operable directly by the motion of said guide vanes for admitting air to said decelerator through said rotor.

3. In combination, a rotor, movable gate mechanism for varying the quantity of liquid admitted to said rotor, and means operable directly by the movement of said mechanism for automatically admitting air at atmospheric pressure to said rotor when the quantity of liquid admitted is below the maximum.

4. In combination, a rotor, a flow decelerator communicating with said rotor, movable gate mechanism for varying the quantity of liquid admitted to said rotor and to said decelerator, and means operable directly by the movement of said mechanism for automatically admitting air at atmospheric pressure to said decelerator only when the quantity of liquid admitted to said rotor is below the maximum.

5. In combination, a rotor, a flow decelerator communicating with said rotor, an annular series of guide vanes for varying the quantity of liquid delivered to said rotor and to said decelerator, means for actuating said guide vanes, and means operable directly by said guide vane actuating means for admitting air to said decelerator.

6. In combination, a rotor, a flow decelerator communicating with said rotor, an annular series of guide vanes for varying the quantity of liquid delivered to said rotor and to said decelerator, means for operating said guide vanes, and means operable directly by said guide vane operating means for admitting air to said decelerator, said air admission means functioning to admit increasing quantities of air as the quantity of liquid admitted is decreased.

7. In combination, a rotor, a housing for said rotor, mechanism for controlling the flow of liquid through said rotor, and a perforated cup valve associated with said housing and operable by said mechanism to admit air to said rotor.

8. In combination, a rotor, a housing for said rotor, said housing having a series of openings therein, gate mechanism for controlling the flow of liquid through said rotor, and a cup valve operable by said gate mechanism for admitting air to said rotor, said cup valve having perforations simultaneously alineable with the openings of said housing.

In testimony whereof, the signature of the inventor is affixed hereto.

FORREST NAGLER.